United States Patent [19]

Reynard

[11] 4,160,590
[45] Jul. 10, 1979

[54] REMOVABLE (LENS POSITION LIMITING) STOP FOR AUTO-MANUAL FOCUSING CAMERAS

[75] Inventor: John M. Reynard, Framingham, Mass.

[73] Assignee: Polaroid Corporation, Cambridge, Mass.

[21] Appl. No.: 896,713

[22] Filed: Apr. 17, 1978

[51] Int. Cl.² ............................................. G03B 3/00
[52] U.S. Cl. .................................................. 354/195
[58] Field of Search ........................ 354/25, 163, 195; 352/139, 140; 355/55, 56; 250/201, 204

[56] References Cited

U.S. PATENT DOCUMENTS

| | | | |
|---|---|---|---|
| 3,482,500 | 12/1969 | Thomas | 352/140 X |
| 3,765,748 | 10/1973 | Mito | 350/187 |
| 3,887,933 | 6/1975 | Miyake | 354/195 |

*Primary Examiner*—L. T. Hix
*Assistant Examiner*—William B. Perkey
*Attorney, Agent, or Firm*—John J. Kelleher

[57] ABSTRACT

A manually positionable lens movement limiting stop is provided that limits the manual movement of a variable focus lens in a photographic camera to within its normal focusing range wherein said camera has a manual and automatic focus control system and wherein said lens must be moved outside of its said normal focusing range for proper automatic focus control system operation.

21 Claims, 7 Drawing Figures

REMOVABLE (LENS POSITION LIMITING) STOP FOR AUTO-MANUAL FOCUSING CAMERAS

BACKGROUND OF THE INVENTION

1. Field of the Invention

The present invention relates to a photographic camera having a variable focus lens and having both manual and automatic focusing means in general, and to such cameras wherein said lens must be moved outside of its normal focusing range for the proper functioning of said automatic focusing means, in particular.

2. Description of the Prior Art

One type of photographic camera having both manual and automatic focus control of a variable focus lens is described in U.S. Patent application Ser. No. 838,585 by PIZZUTI et al. The automatic focus control system described in the said PIZZUTI et al application is of the unidirectional type in that movement of the variable focus lens in such a camera to focus on a subject to be photographed is in one direction only. A detailed description of a unidirectional automatic focus control system for use in the control system of the said PIZZUTI et al application is described in some detail in U.S. Patent application Ser. No. 865,852 by SHENK.

The variable focus lens unidirectional automatic focus control system described in the said SHENK application is of the type that is dependent upon the movement of said lens at least a minimum distance outside of its normal focusing range and the actuation of swtich means by such movement, for proper automatic focus control system operation.

A problem associated with a photographic camera having both manual focus control and an automatic focus control system of the type described in the above-cited SHENK application is the lack of a lens movement limiting stop that will enable a camera operator to tactually determine where the normal focusing range limit is located at that end of said focusing range where a lens movement limiting stop has been omitted to make it possible to utilize the unidirectional automatic focus control system mentioned above.

Even though most manually focusable cameras have subject distance indicia located on the lens mount or bezel as a focusing aid, especially in those cameras without a coupled rangefinder, most camera operators will tactually determine that the lens is focused at one end of its focusing range (normally the lens infinity position) by manually moving the lens into a mechanical stop that would normally be located at said infinity end of its focusing range without looking at the distance indicia on the lens bezel to confirm that the lens was actually moved to its said infinity position, particularly when the camera operator has a limited amount of time in which to photograph a subject. If this type of manual focusing procedure was utilized in a camera having manual focus control and a unidirectional focus control system of the type described in the above-mentioned SHENK application, the lens could be moved outside of its normal focusing range and an out-of-focus picture would result if a picture was taken with the lens so positioned.

SUMMARY OF THE INVENTION

A photographic camera having both manual and automatic focus controls has a variable focus lens that must be moved outside of its normal focusing range for proper operation of the automatic focus control system. This range of lens movement makes it possible for a camera operator to inadvertently move said lens outside of its normal focusing range where it cannot focus on a subject to be photographed, when said camera is in its manual focus control mode, which may result in said camera taking an out-of-focus picture. To avoid such inadvertent movement, a manually positionable lens movement limiting stop is provided to preclude such inadvertent lens movement, said movement limiting stop being positioned to its lens movement limiting position at or after the time that the manual focus control mode is selected. In a camera where manual focusing of the variable focus lens is not provided, movement of said lens movement limiting stop to its lens movement limiting position can be utilized as the means for positioning said lens to a predetermined focus position, such as the lens infinity position, so that an in-focus picture can be taken of a subject located at said position.

DESCRIPTION OF THE PREFERRED EMBODIMENTS

Figure 1:
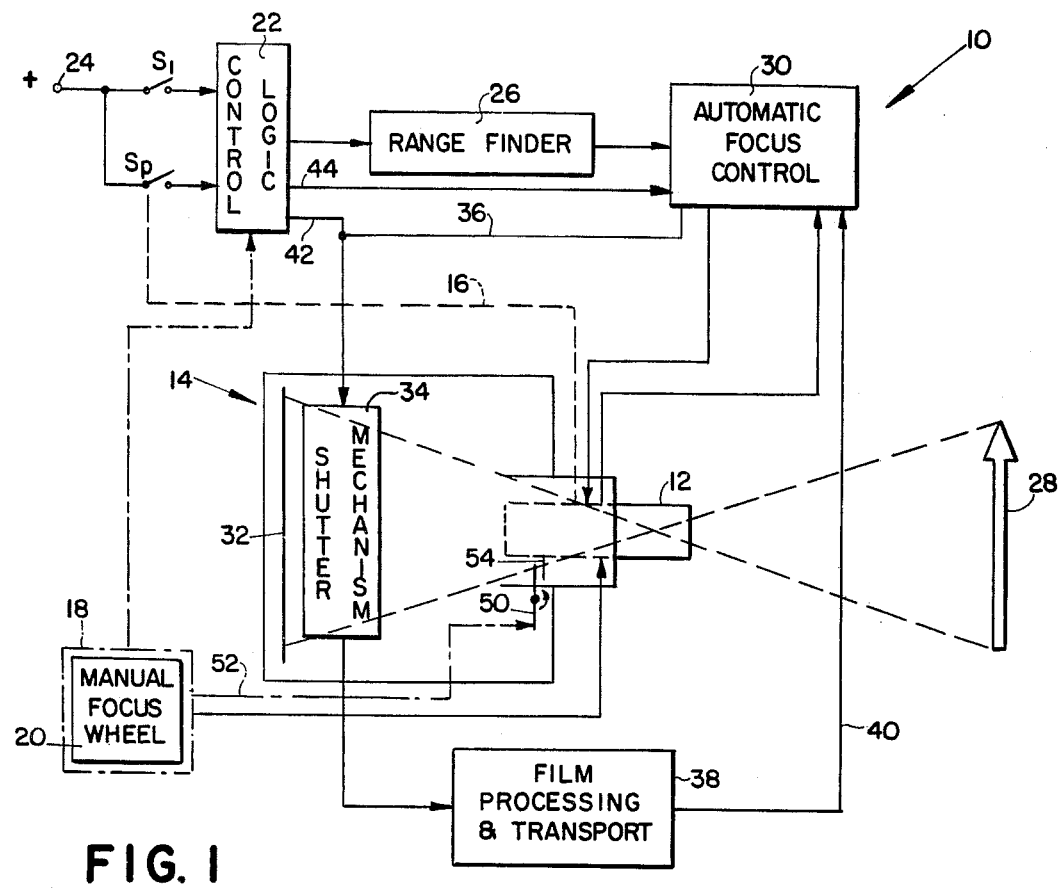
FIG. 1 is a functional block diagram of a photographic camera having both manual and automatic focus controls and having a manually actuated lens movement limiting stop constructed in accordance with a preferred embodiment of the present invention.

Referring now to the drawings and, specifically, to FIG. 1, where a schematic diagram of manual and automatic focus control system 10 for variable focus lens 12, of self-processing camera 14, is depicted. The automatic focus control portion of control system 10 is described in some detail in the above-mentioned application by SHENK and, for convenience, the specification in said SHENK application is specifically incorporated herein. In order to automatically focus variable focus lens 12, switch $S_1$ must be acutated to its closed position. Automatic focusing will be initiated by the closure of switch $S_I$ if lens actuated switch $S_p$, which is coupled to variable focus lens 12 through mechanical linkage 16, has been actuated to its open position by lens 12 movement, and if displaceable barrier or shroud 18 is positioned such that it both precludes manual access to manual focus wheel 20 and enables control logic 22. If switch $S_I$ is actuated to its closed position under these conditions, a portion of the source of power (not shown) which is connected to terminal 24 will, in turn, be routed to the input of rangefinder 26 through control logic 22 thereby activating said rangefinder 26. When so activated, rangefinder 26 acoustically determines the distance to a subject to be photographed such as subject 28. A more detailed explanation of how rangefinder 26 determines distance to a remote object is contained in the above-referenced SHENK application. When the distance to subject 28 has been determined, rangefinder 26 causes automatic focus control 30 to transmit a lens element positioning force to variable focus lens 12 causing said lens 12 to form an in-focus image of subject 28 at film plane 32 of said camera 14 when shutter mechanism 34 has been actuated to its open position by a signal from automatic focus control 30 through path 36. As mentioned above, camera 14 is of the self-processing type and therefore once the actuation of shutter mechanism 34 is complete, film processing and transport cycle 38 is initiated. This cycle initiates film processing and film movement out of said camera 14. If switch $S_l$ is in its open position when film processing and transport cycle complete signal 40 is transmitted to automatic focus control 30, said automatic focus control 30 will cause the movable element of variable focus lens 12 to be driven to the point where lens movement actuated switch $S_p$ is actuated to its open position through said mechanical linkage 16.

To manually focus variable focus lens 12, displaceable barrier or shroud 18 precluding manual access to focus wheel 20 is manually positioned to its displaced position so that said manual focus wheel 20 can be moved by a camera 14 operator. When shroud 18 is so displaced, said displacement configures control logic 22 such that rangefinder 26 is disabled, and variable focus lens 12 is moved such that switch $S_p$ is actuated to its closed position. When manual focusing is complete, shutter mechanism 34 may be actuated, for picture taking purposes, by manually actuating switch $S_1$ to its closed position which will cause a shutter actuating signal to be sent to shutter mechanism 34 through path 42. When shutter mechanism 34 has been fully actuated, film processing and transport cycle 38 is then automatically initiated.

In order to return the focus control system to its automatic mode, shroud 18 is repositioned over manual focus wheel 20, said repositioning causing control logic 22 to enable rangefinder 26 and to cause focus control 30 to actuate switch $S_p$ to its open position by the movement of variable focus lens 12. If lens actuated switch $S_p$ was actuated to and left in its closed position by the manual movement of variable focus lens 12 by manual focus wheel 20, automatic focus control 30 will sense said switch $S_p$ closure through path 44 when said shroud 18 is repositioned over manual focus wheel 20, and will cause said variable focus lens 12 to be driven until switch $S_p$, which is mechanically coupled to variable focus lens 12 through linkage 16, is actuated to its open position by variable focus lens 12 movement. The operation of control system 10 is largely dependent upon the rotational and axial position of the movable element of variable focus lens 12. Therefore, at this point, it would be useful to refer to FIG. 2 in order to appreciate the full range of said lens 12 element movement and how said lens element movement relates to the operation of control system 10.

Figure 2:
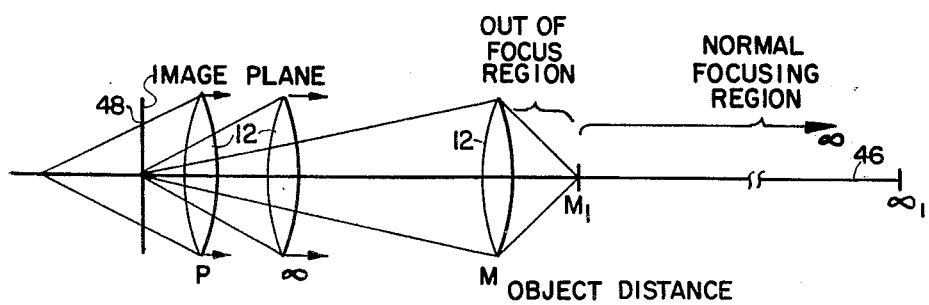
FIG. 2 is a schematic diagram showing the full range of movement of the variable focus lens controlled by the manual and automatic focus control system of the present invention.

In FIG. 2, variable focus lens 12 is, for convenience, artifically depicted as a single lens element that is movable along object distance axis 46 for focusing purposes and not as a multiple element lens having both fixed and movable elements as found in most variable focus lens cameras. Any object located between position $M_1$ and $\infty_1$ on object distance axis 46 is focusable by variable focus lens 12 at image plane 48 (which corresponds to image plane 32 in FIG. 2) when variable focus lens 12 is positioned between positions M and $\infty$. The distance to an object located at $M_1$ represents the minimum focusing distance of said variable focus lens 12. Objects positioned at $\infty_1$ or beyond, on object distance axis 46, will have an image focused at image plane 48 by variable focus lens 12 when said variable focus lens 12 is positioned at its said $\infty$ position. Objects appearing to the left of position $M_1$ on object distance axis 46 cannot be sharply focused at image plane 48 by variable focus lens 12 and therefore objects appearing to the left of said position $M_1$ will be considered as being in the out-of-focus region of variable focus lens 12. Objects located at or to the right of position $M_1$ on object distance axis 46 are within the normal focusing range of variable focusing lens 12.

In addition to the movement of variable focus lens 12 within its normal focusing range, variable focus lens 12 is also movable outside of its normal focusing range between its $\infty$ position, and position P which represents the park position of variable focus lens 12 or the position at which switch $S_p$ (FIG. 1) is in its open position. When variable focus lens 12 is located between its $\infty$ position and its park position, it is unable to focus a sharp subject image at image plane 48.

From the foregoing it can be seen that variable focus lens 12 must be free to move outside of its normal focusing range to the park position of said lens 12 for proper automatic focus control system operation. As a consequence of this requirement, it is possible for a camera operator to inadvertently move said lens outside of its normal focusing range where it cannot sharply focus on a subject to be photographed when the manual and automatic focusing camera of the present invention is in its manual focus control mode and take an out-of-focus picture when said lens 12 is so positioned. There is a high probability of an out-of-focus picture being taken in such a camera because most camera operators tactually determine, i.e., determine by the sense of touch, when the lens is focused at one end of its focusing range (normally the lens $\infty$ position) by manually moving the lens into a mechanical stop that would normally be located at the said infinity position of its focusing range without looking at distance indicia on the lens mount or bezel to confirm that the lens was actually positioned to its $\infty$ position. To preclude this misfocusing possibility, a lens movement limiting stop is provided that is positioned to its lens movement limiting position when the manual focus control mode is selected. FIG. 1 schematically depicts this lens movement limiting arrangement.

Referring again to FIG. 1, shroud 18 is shown adjacent focus wheel 20 to preclude inadvertent actuation of said focus wheel 20 when said shroud 18 is in its protective position. Shroud 18 is mechanically coupled to movable stop 50 through mechanical linkage 52. When shroud 18 is moved to its displaced position to enable a camera operator to actuate manual focus wheel 20 for variable focus lens 12 focusing purposes, movable stop 50 is positioned such that said stop 50 will engage projection 54 on variable focus lens 12 when said variable focus lens 12 is moved to one end of its normal focusing range. The specific details of the lens movement limiting stop of the present invention and how it cooperates with shroud 18 is shown in FIG. 3.

Figure 3:
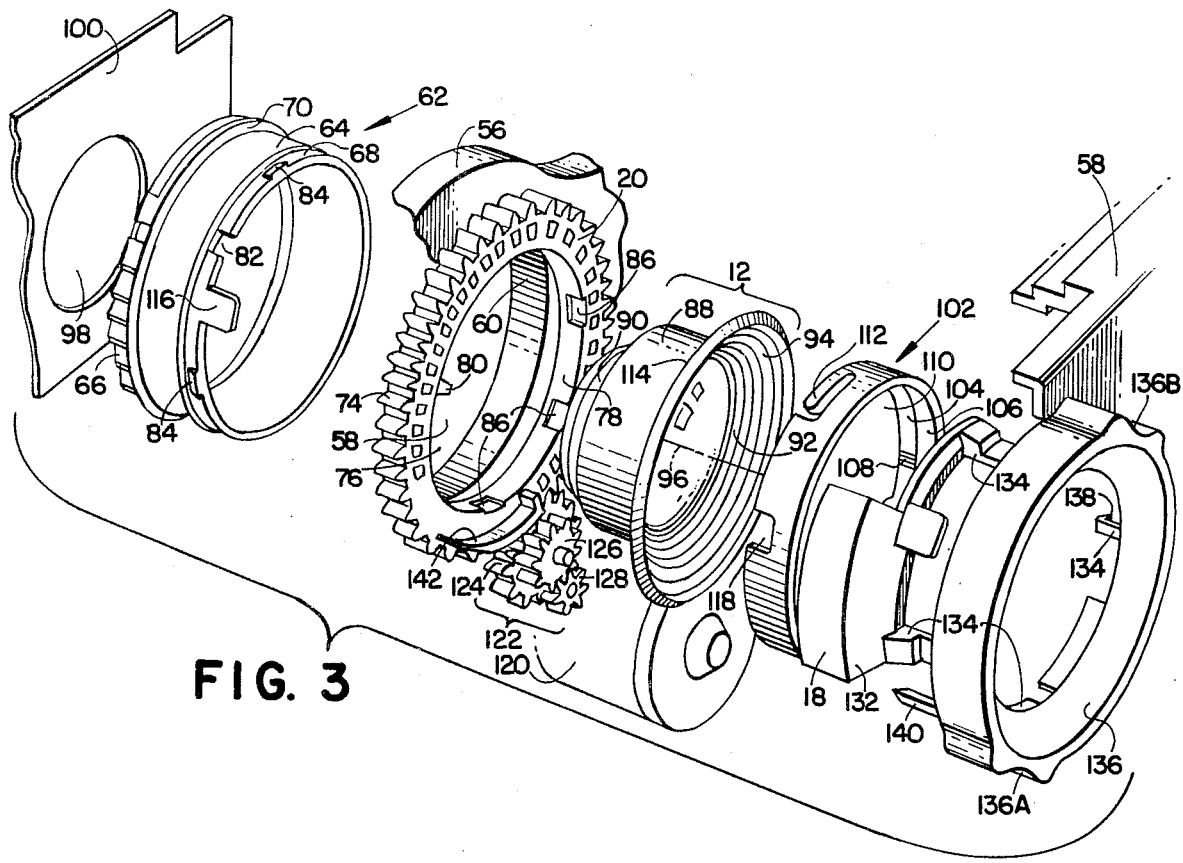
FIG. 3 is an exploded perspective view of a variable focus objective lens mounting and drive means and of the manually positional means of the present invention for limiting manual lens movement.

FIG. 3 is an exploded perspective view of variable focus lens 12 mounting and drive means and of the manually positionable means for limiting said lens 12 movement. Anchor plate 56 is mounted in a fixed position with respect to housing 58 of camera 10 and provides the main support structure for the variable focus lens 12 focusing means. Anchor plate 56 includes opening 58, of circular cross section, forming cylindrical bearing surface 60 in said anchor plate 56. Ratchet member 62 includes center portion 64 of circular cross section having a cylindrical outer bearing surface, a ratchet wheel 66 at one end thereof and a shoulder portion 68, having a cylindrical outer surface, at the end opposite said ratchet wheel 66 end. Ratchet member 62 is assembled on anchor plate 56 by inserting the shoulder end 68 of said ratchet member 62 through opening 58 in anchor plate 56 to the point where flange 70 of ratchet member 62 engages said anchor plate 56. As so assembled, the cylindrical bearing surface of center portion 64 of ratchet member 62 is supported by cylindrical bearing surface 60 in opening 58 of anchor plate 56, for rotation thereon. Combination manual focus wheel and encoder gear 20 includes teeth 74 at the periphery thereof and an opening 76 therethrough that forms generally cylindrical surface 78, of circular cross section, in said focus wheel 20. With ratchet member 62 fully assembled on anchor plate 56, shoulder portion 68 of ratchet member 62 extends through opening 58 in anchor plate 56. Focus wheel 20 is assembled on said shoulder portion 68 of ratchet member 62 by aligning tab 80 of focus wheel 20 with slot 82 in shoulder portion 68 of ratchet member 62 and then sliding opening 76 of focus wheel 20 over shoulder portion 68 of ratchet member 62 to the point where fingers 84 on said shoulder portion 68 engage recesses 86 in focus wheel 20 such that said focus wheel 20 is placed in a fixed position with respect to ratchet member 62 which maintains center portion 64 of ratchet member 62 within opening 58 of anchor plate 56, for rotation therein.

Variable focus lens 12 includes internally threaded cylindrical housing 88 of circular cross section having concentric cylindrical neck portion 90 at one end thereof, said housing 88 having a lens (not shown), for image formation, mounted therein. Lens 12 also includes mating, externally threaded cylindrical housing 92, of circular cross section, said housing 92 having an outward tapering end 94 and having a lens for image formation mounted therein. The lenses mounted in housings 88 and 92 cooperate with one another to form an image at focal plane 32 (FIG. 1) in photographic camera 10 along principal image forming axis 96. Variable focus lens 12 is positioned in opening 58 of anchor plate 56 such that cylindrical neck 90 of lens housing 88 extends through circular opening 98 in lens support structure 100, with tapering end 94 of lens housing 92 projecting through opening 76 in focus wheel 20. Cylindrical neck 90 of variable focus lens housing 88 is attached to support structure 100, by conventional means, once said neck 90 has been fully inserted into lens support structure opening 98. Support structure 100 is in a fixed relation with respect to housing 58 of camera 10 and therefore this places said lens housing 88 in a fixed position with respect to said camera housing 58.

Lens retainer ring 102, of generally cylindrical shape, includes cylindrical inner surface 104 and sloping or beveled inner surface 106. Internal cylindrical surface 104 of lens retainer ring 102 includes three groups of parallel grooves 108, said groove groups being equally spaced around inner surface 104 of lens retainer ring 102 and said grooves being longitudinally oriented in that they are parallel to the central axis through opening 110 in said lens retainer ring 102. Retainer ring 102 also includes three flexible fingers 112 (only one shown) having cams on their inner surfaces, said fingers being equally spaced around and formed from the cylindrical wall of lens retainer ring 102. The radial outer edge of tapering end 94 of housing 92 has a plurality of grooves 114 that are uniformly spaced around said periphery of tapering end 94, said grooves 114 being for cooperative engagement with grooves 108 in cylindrical portion 104 of lens retainer ring 102. Grooves 114 on the periphery of tapering end 94 are parallel to principal image forming or optical axis 96 of variable focus lens 12. Lens retainer ring 102 is placed over the grooved edge of said tapering end 94 such that grooves 114 of said end 94 cooperatively engage grooves 108 in cylindrical surface 104 of lens retainer ring 102 and such that said cams on the faces of fingers 112 engages the periphery of said end 94 forcing said fingers 112 radially outward as retainer ring 102 moves further onto said tapering end 94. The cam faces of fingers 112 ultimately disengage the periphery of said end 94 and spring down behind the peripheral edge of said tapering end 94. At this point, lens retainer ring 102 is axially and rotationally locked to lens housing 92. Also, as lens retainer ring 102 is placed over tapering end 94, tongue 116 projecting from shoulder portion 68 of ratchet member 62 engages slot 118 in said lens retainer ring 102. Rotary motion of ratchet member 62 will now be mechanically linked to lens housing 92 by the engagement of said tongue 116 with lens retainer ring 102. The axial movement of lens housing 92 resulting from the focusing of lens 12 will cause movement of retainer ring 102 with respect to ratchet member 62 along principal image forming axis 96. This relative axial movement of lens housing 92 is compensated for by the movement of tongue 116 either into or out of slot 118 in lens retainer ring 102.

To manually focus variable focus lens 12, a camera operator manually rotates focus wheel 20 about principal image forming axis 96. Rotation of focus wheel 20 about principal image forming axis 96 causes the cylindrical outer surface of center portion 64 of ratchet member 62 to rotate on inner cylindrical surface 60 of anchor plate 56. Rotation of ratchet member 62 causes the rotation of lens retainer ring 102 because of tongue member 116 in ratchet member 62 being mechanically linked with slot 118 in lens retainer ring 102. With lens retainer ring 102 and housing 92 being in a fixed relation with respect to one another as previously described, the rotation of retainer ring 102 causes the movement of housing 92 and the lens mounted therein. With lens housing 88 maintained in a fixed position with respect to support structure 100 and camera housing 58, housing 92 of variable focus lens 12 is rotatably and axially moved about and along principal image forming axis 96 as the external threads on cylindrical housing 92 are threaded into or out of the internal threads of cylindrical housing 88. Rotation of housing 92 of variable focus lens 12 with respect to lens housing 88 causes a change in the effective focal length of said variable focus lens 12. For powered movement of variable focus lens 12, a lens drive signal is supplied to rotary actuator or motor 120 of automatic focus control 30 (FIG. 1) as the result of the keying of rangefinder 26 (FIG. 1) by the actuation of switch $S_1$ (FIG. 1) to its closed position. Motor 120 is mounted in a fixed position with respect to anchor plate 56 and is coupled to focus wheel 20 through gear train 122. Gear train 122 includes a clutch which is comprised of clutch gear 124 and clutch pinion gear 126, said gears being rotatably and coaxially mounted on anchor plate 56, said clutch gear 124 being urged into frictional engagement with said clutch pinion gear 126 by spring means (not shown), such that rotation of clutch pinion gear 126 causes the rotation of clutch gear 124. Clutch pinion gear 126 is rotatably driven by motor pinion gear 128, said gears 126 and 128 being in a meshed relation and said motor pinion gear 128 being in a fixed relation with respect to the rotor shaft of drive motor 120. The teeth of clutch gear 124 are in a meshed relation with respect to teeth 24 of focus wheel 20 and therefore, the rotation of the rotor of motor 120 will result in the rotation of focus wheel 20. When variable focus lens 12 has been focused to the correct subject-in-focus position as determined by lens position sensing means (not shown) in automatic focus control system 30 (FIG. 1) a pawl (not shown) is caused to engage ratchet wheel 66 on ratchet member 62 thereby stopping said variable focus lens 12 at said correct subject-in-focus position. These features of control system 30 are described in greater detail in the above-cited SHENK application. The effect on variable focus lens 12 of rotating focus wheel 20 about principal image forming axis 96 by motor 120 is the same as that resulting from the manual rotation of said focus wheel 20 by a camera 10 operator.

As can be seen from the foregoing, rotation of motor 120 will result in the simultaneous rotation of manual focus wheel 20. If a camera 10 operator attempts to manually focus lens 12 while automatically focusing said variable focus lens 20 by motor 120, said focusing will be interfered with and may even be prevented. To avoid this problem, cover 18 is provided to impede access to peripheral teeth 74 of focus wheel 20 during automatic focusing. Arm 132 extends laterally from two projections 134 of automatic/manual (A/M) light shield or collar 136, said arm 132 terminating in a curved outer end forming said cover 18, said cover conforming to the shape of a smooth curve formed by a line connecting points located on the periphery of focus wheel 20. A/M collar 136, of generally cylindrical shape, is mounted for rotation about principal image forming axis 96, said collar 136 being rotatably mounted in a circular opening in said camera housing 58. A/M collar 136 rotates on the outer surfaces of a plurality of the projections 134 that are equally spaced around the cylindrical periphery of said collar 136, said projections extending from said A/M collar 136 in the same direction as that of principal image forming axis 96, said axis 96 being generally coincident with the longitudinal central axis of said collar 136. Two of these projections have flexible free ends 138 with raised portions on an outer surface that grip an inner surface of housing 58 once said A/M collar 136 has been fully inserted through the opening in housing 58 in which said collar is mounted. The two other 134 projections provide the structural support for arm 132 and cover 18 as previously noted. A/M collar 136 projects substantially beyond the front of housing 58 so that said collar 136 can be readily gripped by a camera 10 operator. The position of A/M collar 136 is such that it is spaced from and does not interfere with the axial movement of housing 92 of variable focus lens 12 as said lens 12 is moved through its entire focusing range.

Cover 18 is rotated about principal image forming axis 96 by the manual rotation of A/M collar 136. To facilitate the manual rotation of A/M collar 136, a pair of projections 136a, 136b have been provided on the outer cylindrical surface of A/M collar 136, said projections having concave surfaces at the outer extremities thereof. A/M collar 136 also includes projection 140 that functions as the movable stop of the present invention. Projection or movable stop 140 extends from said A/M collar 136 in the same direction as that of principal image forming axis 96, said projection being parallel to the longitudinal central axis of said collar 136. When fully assembled, movable stop 140 will be positioned for engagement with cam portion 142 projecting from the front face of manual focus wheel 20 when the manual focus mode is selected. A clearer understanding of how movable stop 140 cooperates with cam portion 142 of focus wheel 20 can be obtained by also referring to FIG. 4.

Figure 4:
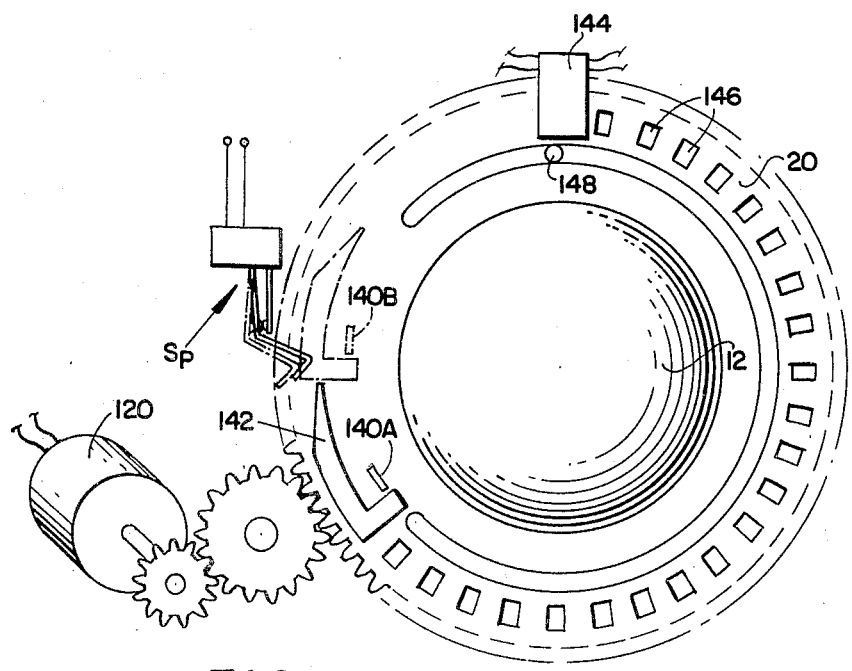
FIG. 4 is an enlarged front elevational view of the combination focus wheel and encoder gear depicted in FIG. 3 showing said means for limiting lens movement in greater detail.

FIG. 4 is an enlarged front elevational view of manual focus wheel 20 depicted in FIG. 3 showing how movable stop 140 limits the rotation of said manual focus wheel 20 when the manual focus mode is selected. The manual focus mode is selected by rotating collar 136 in FIG. 3 counterclockwise until movable stop 140 engages a portion of camera housing 58 (not shown), which places said movable stop 140 in position 140A of FIG. 4. With movable stop 140 in this position, manual focus wheel 20 can be freely moved in a counterclockwise direction throughout the normal focusing range of variable focus lens 12. However, clockwise movement of manual focus wheel 20 will be arrested when cam portion 142 of said focus wheel 20 engages movable stop 140 located at position 140A. The 140A position of movable stop 140 corresponds to one end of the normal focusing range of variable focus lens 12.

The automatic focus control mode is selected by rotating collar 136 in a clockwise direction until it engages a portion of housing 58 (not shown) and places the movable stop projecting from said collar 136 in position 140B of FIG. 4. With movable stop 140 located at position 140B, rotary actuator 120 is free to move variable focus lens 12 throughout its complete operational range in response to a rangefinder 26 (FIG. 1) derived signal, said operational range including movement within and outside of the normal focusing range of variable focus lens 12. As variable focus lens 12 is moved to a focus position within its normal focusing range by rotary actuator 120, the position of variable focus lens 12 is monitored by pickoff module 144. Pickoff module 144 includes a light emitting diode and a light sensitive transistor that is sensitive to the light output from said light emitting diode. As manual focus wheel and encoder gear 20 is rotated by rotary actuator 120, slots 146 in said focus wheel 20 ultimately block and unblock the light being transmitted between the light emitting diode and the light sensitive transistor in pickoff module 144, which generates pulses that are representative of the position of variable focus lens 12. These pulses are routed to automatic focus control 30 (FIG. 1) where they are processed. When focusing is complete or when focusing is complete and a film processing and transport cycle is complete, which ever the case might be, rotary actuator 120 rotates focus wheel 20 in a clockwise direction until cam portion 142 of focus wheel 20 engages switch $S_p$ and actuates said switch $S_p$ to its open position thereby deactivating the drive signal to rotary actuator 120. With movable stop 140 in position 140B, said movable stop 140 does not interfere with the movement of variable focus lens 12 outside of its normal focusing range or with the movement of cam portion 142 of focus wheel 20 into engagement with switch $S_p$. An additional mechanical stop 148 is provided to insure that variable focus lens 12 does not move beyond a position where physical damage to said variable focus lens 12 may result.

Figure 5:
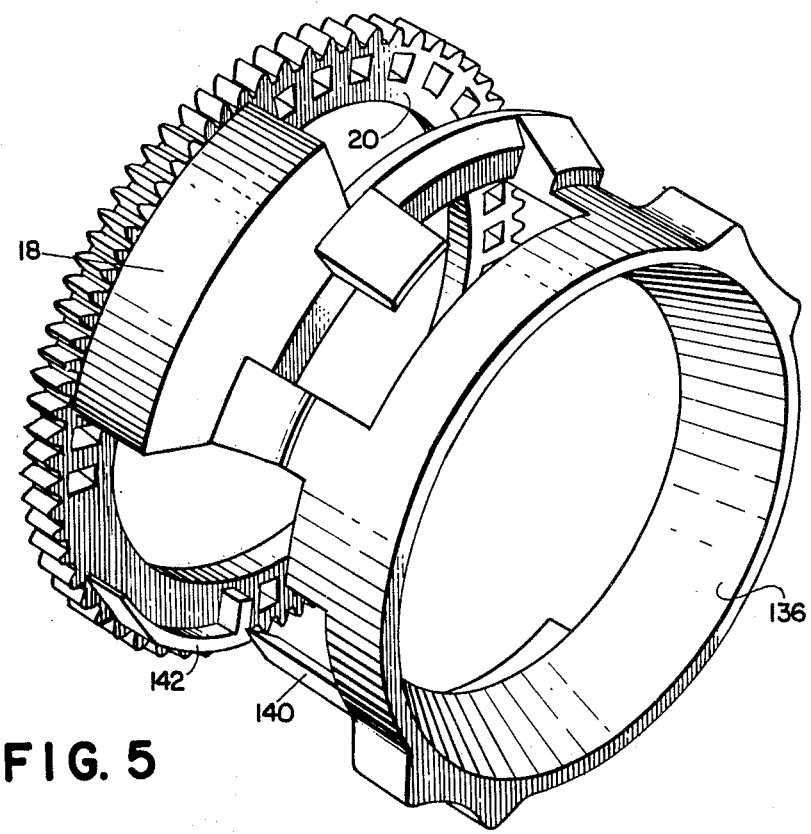
FIG. 5 is an enlarged perspective view of the encoder gear and displaceable cover depicted in FIG. 3, showing said components only, but in greater proximity to one another than in said FIG. 3.

FIG. 5 is an enlarged perspective view of the manual focus wheel and the A/M collar mounted displaceable cover depicted in FIG. 3 showing said components in greater proximity to one another than in said FIG. 3 and having those components normally appearing between manual focus wheel 20 and collar 136 artificially removed. Collar 136 and manual focus wheel 20 are coaxially positioned with respect to one another with movable stop 140 projecting from collar 136 and being adjacent cam portion 142 of said manual focus wheel 20, with cover 18 being adjacent the peripheral teeth of manual focus wheel 20. When movable stop 140 is subsequently moved into position where it can limit rotational movement of manual focus wheel 20, cover 18 will preclude access to that portion of the teeth on manual focus wheel 20 that are beneath said cover 18.

Figure 6:
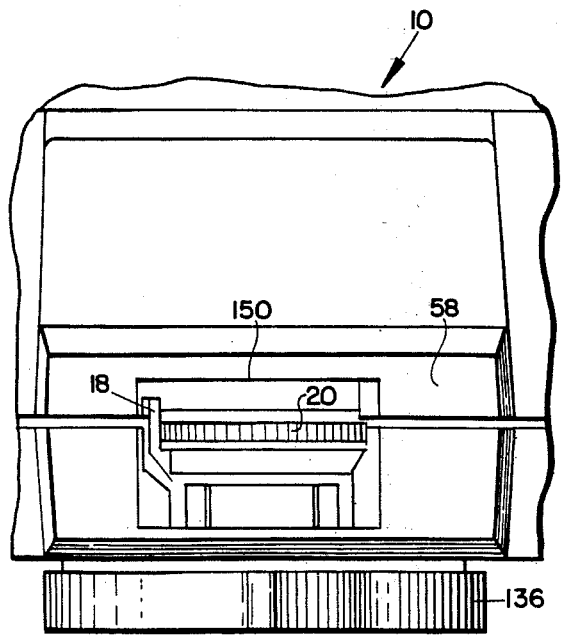
FIG. 6 is a top view of a portion of the photographic camera of the present invention and its manual focus wheel, showing the protective cover for said manual focus wheel in its displaced position.
Figure 7:
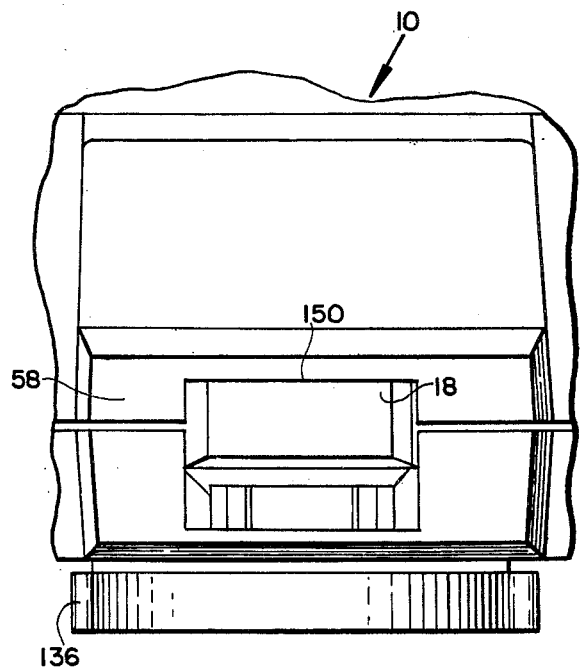
FIG. 7 is the same view as that depicted in FIG. 6 except that said cover is in the position where it impedes access to said manual focus wheel.

FIG. 6 is a top view of a portion of fully assembled photographic camera 10 showing manual focus wheel 20 through opening 150 in housing 58 of said camera 10. Cover 18 has been rotated to its displaced position by the counterclockwise rotation of collar 136 making manual focus wheel 20 accessible to a camera 10 operator. In this position, movable stop 140 (FIG. 3) projecting from said coller 136 is in position 140A (FIG. 4) where it limits variable focus lens movement to within its normal focusing range. However, in FIG. 7, which is the same view of camera 10 as that depicted in FIG. 6, cover 18 has been moved to a position where it precludes manual access to focus wheel 20 by the rotation of collar 136 in a clockwise direction to the point where it engages a portion of housing 58. In this position, manual focus wheel 20 is no longer manually accessible through opening 150 in housing 58 of of camera 10. With cover 18 in a position where it impedes access to manual focus wheel 72, lens movement limiting stop 140 projecting from said collar 136 is in position 104B (FIG. 4) where it no longer can arrest movement of said focus wheel 20.

DISCUSSION

When the manually positionable lens movement limiting stop of the present invention is placed in the position where it limits variable focus lens movement, the automatic focus control system must be disabled to avoid damage to said control system and/or to said movement limiting stop. This disabling can take place prior to the positioning of said movable stop to its lens movement limiting position but, in the preferred embodiment, this disabling is effected simultaneous with such lens movement stop positioning.

Disabling of the automatic focus control system may be effected, for example, by disabling the lens drive means, by rendering automatic focus control 30 (FIG. 1) insensitive to the output signal from rangefinder 26 (FIG. 1), by disabling said rangefinder 26 or by any combination thereof. Switch means actuated by shroud 18 movement which can be utilized for automatic focus control disablement is depicted and described in the above-mentioned PIZZUTI et al. application.

In a camera where manual focusing of the variable focus lens is not provided, movement of said lens movement limiting stop to its lens movement limiting position can be utilized as the means for positioning said lens to a predetermined focus position, such as the lens infinity position, so that an in-focus picture can be taken of a subject located at said position. In this arrangement, stop 140 projecting from A/M collar 136 would engage cam portion 142 of manual focus wheel 20 when A/M collar 136 is moved to the manual focus position and move the movable element of variable focus lens 12 to said infinity position.

It will be apparent to those skilled in the art from the foregoing description of my invention that various improvements and modifications can be made in it without departing from its true scope. The embodiment described herein is merely illustrative and should not be viewed as the only embodiment that might encompass my invention.

What is claimed is:

1. A photographic camera operative in either a manual or an automatic focusing mode, said camera comprising:
    means for defining an image plane;
    means for directing scene light along a given optical path to said image plane, said directing means including a lens assembly having a lens mounted for displacement over a focusing range wherein various positions thereof respectively serve to focus an image at said image plane of subjects positioned in various locations within a predetermined range of subject distances, and for further displacement from its said focusing range into a second range wherein it does not serve to focus images at said image plane of subjects positioned within said predetermined subject distance range;
    means for selectively coupling said camera to a source of electrical energy;
    ranging and focusing means for producing a signal indicative of the position of a particular subject selected to be photographed and for effecting movement of said lens from its said second range to a position in said focusing range in accordance to said signal where said lens serves to focus an image of said particular subject at said image plane;
    means for unblocking and blocking said optical path to produce an exposure interval; and
    manually actuatable means for selecting the manual focusing mode of said camera, said manually actuatable means including means for limiting the manual displacement of said lens to within its said focusing range when said manual focusing mode is selected.

2. The camera of claim 1, wherein said manually actuatable means includes means for automatically displacing said lens from said second range to its said first range.

3. The camera of claim 1, wherein said manually actuatable means includes a member mounted for displacement between a first position and a second position, and means carried by said member for engaging said lens assembly when said member is in its said second position so as to limit the displacement of said lens to its said first range.

4. The camera of claim 1, including means for rendering said lens movement means nonresponsive to said ranging signal when the manual focus control mode is selected.

5. The camera of claim 1, including means for disabling said subject position ranging signal when the manual focus control mode is selected.

6. The camera of claim 1, including means for disabling said subject position ranging signal and said lens movement means when the manual focus control mode is selected.

7. The camera of claim 1, wherein said means for limiting the manual displacement of said lens to within its said focusing range positions said lens to a single predetermined focus position when the manual focusing mode is selected.

8. The camera of claim 1, additionally comprising:
an actuator, said actuator being mechanically coupled to said lens assembly for manually positioning said lens within its said predetermined range and its said second range;
a cover member mounted for manual displacement between a first position where it precludes direct manual access to said actuator, and a second position where it does not preclude direct manual access to said actuator; and
a lens member mounted in a fixed position with respect to and for movement with said variable focus lens, said lens member being engageable with a portion of said cover member to limit said lens movement to within its said focusing range when said cover member is positioned to its said second position.

9. The camera of claim 8, wherein said lens member is of generally cylindrical shape with a raised portion projecting from a surface thereof, and said cover member includes an elongated portion projecting therefrom for lens movement limiting engagement with the said raised portion of said cylindrical shaped lens mounted member.

10. The camera of claim 8, wherein said lens mounted member is said actuator.

11. A photographic camera comprising:
an image plane;
means for selectively coupling said camera to a source of electrical energy;
a manually focusable lens mounted for displacement over a given operational range wherein it alternately serves to focus images of subjects positioned in various locations within a normal range of selectable subject distances at said image plane, and also for displacement outside of its said given operational range into another range wherein it does not serve to focus images of subjects positioned within said normal selectable subject distance range at said image plane;
means for producing a signal indicative of the position of a particular subject selected to be photographed;
drive means responsive to said signal for effecting the movement of said lens from a position within its said other range into a position within its said operational range where it serves to focus an image of the particular subject at said image plane to facilitate the recording of an image of the particular subject on film located at said image plane; and
manually actuatable means for selectively limiting the movement of said manually focusable lens to within its said normal focusing range, said manually actuatable means inhibiting said signal responsive movement of said lens when actuated to its lens movement limiting position.

12. The camera of claim 11, wherein said means for selectively limiting the manual movement of said lens to within its said focusing range positions said lens to a single predetermined focus position when said means is actuated to said lens movement limiting position.

13. A camera as defined in claim 11, wherein said lens movement limiting means causes the disablement of said signal producing means when displaced to its said lens movement limiting position.

14. A camera as defined in claim 11, wherein said lens movement limiting means causes the disablement of said drive means when displaced to its said lens movement limiting position.

15. A photographic camera comprising:
an image plane;
means for selectively coupling said camera to a source of electrical energy;
a variable focus lens mounted for displacement over a given operational range wherein it alternately serves to focus images of subjects positioned in various locations within a normal range of selectable subject distances at said image plane, and also for displacement outside of its said given operational range into another range wherein it does not serve to focus images of subjects positioned within said normal selectable subject distance range at said image plane;
an actuator, mechanically coupled to said variable focus lens, for manually positioning said lens within and outside of its said given operational range;
means for producing a signal indicative of the position of a particular subject selected to be photographed;
drive means responsive to said signal for effecting the movement of said lens from a position within its said other range into a position within its said operational range where it serves to focus an image of the particular subject at said image plane to facilitate the recording of an image of the particular subject on film located at said image plane, said drive means being mechanically coupled to said manually actuatable lens positioning actuator;
a cover member mounted for manual displacement between a first position where it precludes direct manual access to said actuator, and a second position where it does not preclude direct manual access to said actuator; and
means for selectively limiting the movement of said variable focus lens to within its said normal focusing range and for inhibiting said signal responsive movement of said lens, said movement limiting and inhibiting functions being performed when said cover is displaced to its said second position.

16. The camera of claim 15, wherein said means for selectively limiting the manual movement of said lens to within its said focusing range positions said lens to a single predetermined focus position when said means is actuated to said lens movement limiting position.

17. A camera as defined in claim 15, wherein said lens movement limiting and inhibiting means causes the disablement of said signal producing means when displaced to its said second position.

18. A camera as defined in claim 15, wherein said lens movement limiting and inhibiting means causes the disablement of said drive means when displaced to its said second position.

19. A camera as defined in claim 15, wherein said means for limiting movement of said lens includes a member mounted in a fixed position with respect to and for movement with said variable focus lens, said member being engageable with a portion of said cover member to limit said lens movement when said cover member is positioned to its said second position.

20. The camera of claim 19, wherein said lens mounted member is of generally cylindrical shape with a raised portion projecting therefrom and said cover member includes an elongated portion projecting therefrom for lens movement limiting engagement with the sand raised portion of said cylindrical shaped actuator.

21. The camera of claim 20, wherein said lens mounted member is said actuator.

* * * * *